Patented Sept. 2, 1952

2,608,723

UNITED STATES PATENT OFFICE 2,608,723

PROCESS FOR THE PRODUCTION OF AMYLOSE FILMS

Ivan A. Wolff, Howard A. Davis, James E. Cluskey, and Laetta J. Gundrum, Peoria, Ill., assignors to the United States of America as represented by the Secretary of Agriculture No Drawing. Application August 1, 1950, Serial No. 177,114

16 Claims. (Cl. 18—57)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to a method for producing self-supporting films from amylaceous materials comprising predominately amylose. The invention also includes novel methods for casting such amylose films and novel methods for drying the cast films.

In application Ser. No. 128,901, filed November 22, 1949, by Davis et al., there is described a method for producing amylaceous films consisting predominately of amylose, the linear fraction of starch. In that application amylose or starch composed predominately of amylose is dissolved in an aqueous solution containing an amylose-complexing agent, such as low molecular weight aliphatic alcohols, such as ethanol, propanol, butanol, pentanol and the like, low molecular weight glycol ethers (i. e. glycol ethers of low molecular weight alcohols), such as diethyl Cellosolve, organic bases, such as pyridine or other agencies as disclosed, for example by Whistler and Hilbert in JACS 67, 1161 (1943). For the purpose of their invention, Davis et al. employ those amylose-complexing agents having appreciable solubility in water.

An amylose complexing agent is a reagent which selectively precipitates amylose from a starch paste by combining with the amylose in the form of a molecular complex. Starch has been fractionated by suspending it in an aqueous medium in the presence of a wide variety of chemical agents known as complexing agents. The suspension is then heated, and after the solution is complete, it is cooled slowly, whereupon the amylose precipitates in the form of a complex with the complexing agent. The precipitated complex may be separated, thus effecting a separation between amylose and amylopectin. Complexing agents for amylose constitute a class of reagents well-known and established in carbohydrate chemistry. Although the complexing agents assist in separating amylose from admixture with amylopectin by precipitation upon cooling, we have found that they also serve to promote solution of amylose upon heating.

For the sake of brevity the term "amylose films" as used hereinafter is intended to refer to films composed predominately of amylose. The term "amylose" as used in this specification refers to a polydisperse, predominately linear 1,4-linked anhydroglucose polymer usually obtained by the fractionation of starch. This starch fraction is also known as the "A" fraction.

In preparing their amylose film-forming solutions the inventors prefer to wet the amylose with the complexing compound, adding the wet powder or slurry to hot water, with vigorous agitation. The solutions may also be prepared by saturating the water with the complexing compound and then adding the powdered amylose. The specific manner in which the solution is finally obtained is not critical, however, since it is only necessary that a relatively clear solution be obtained to produce satisfactory film.

According to the prior invention, the films were formed by casting or spraying the solution upon a smooth surface. The inventors found it necessary in most cases to keep the cast solution at a temperature sufficiently high to avoid gelling and/or retrograding until the films were substantially dry. The casting solutions range from 2 percent up to approximately 30 percent amylose by weight.

This invention has among its objects certain improvements on the Davis et al. process. We have found, for example, that the butanol or other complexing agents as used by Davis et al. may be removed from the casting solution as by azeotropic distillation before the solution is cast or the films are otherwise formed. We have discovered the remarkable fact that films cast from such solutions are markedly superior in appearance to films cast from solutions which have contained no complexing agent and definitely superior to films cast by the Davis et al. process in which the complexing agent is not removed. We have discovered, moreover, that it is unnecessary in our process to maintain the cast films at elevated temperatures above the temperature of gelation, in order to produce films of desired strength, transparency, and uniformity. If films made according to the prior process were permitted to cool to the point of gelation before substantially dry, the films were hazy and tended to crack. Moreover, the presence of small amounts of complexing reagent in the prior films often caused uneven gelation of the film resulting in a haze pattern of alternate clear and cloudy areas. On the contrary, films made by our present process may be cast upon plates at room temperature, allowed to gel, and then dried at room temperature. These final films are superior in clarity, smoothness and uniformity of thickness to those obtained by the process of Davis et al.

Although amylose has been considered by some chemists to be completely soluble in boiling water, we have found that solutions made with water only produce poor films. The films are hazy and have a granular appearance apparently due to the presence of undissolved gel particles. The presence of undissolved gel particles may in part account for the marked inferiority of such amylose films compared with those of our invention, but we do not wish to be limited by any theoretical considerations. We are unable to explain with complete exactness the superiority of our films.

According to our process, the amylose or amylaceous material composed predominantly of amylose is dissolved as previously described with the aid of a complexing agent. The amount of complexing agent and particular manner in which the solution is obtained is not critical, and for best results we employ a final aqueous medium approximately saturated with the complexing agent. The solution may also contain fillers, dyes, modifiers, such as plasticizers, and the like.

After a clear solution is obtained, which may require heating nearly up to the boiling point, the complexing agent is removed as by azeotropic distillation. Additional distilled water may be used initially or added for the purpose of obtaining the desired concentration and viscosity. The solution is then ready for the film-forming operation.

The film-forming operation is embodied in the specific examples which follow, showing the casting of films upon flat smooth surfaces. It is to be understood, however, that the film-forming operation may alternatively involve spraying, dip coating, and the like methods.

In our researches we have discovered, moreover, that amylose films are peculiar in their stripping properties, and these peculiarities often render difficult the production of films. For example, amylose films adhere tightly to glass surfaces. Although they may be cast upon smooth metal surfaces, particularly chrome-plated surfaces, and stripped therefrom, the humidity conditions at the time of casting, the cleanness of the surface, slight scratches upon the surface, and other less tangible factors, cause the dried film to stick unpredictably.

We have discovered that smooth surfaces, such as glass or metal surfaces, may be prepared so as to render cast amylose films readily strippable therefrom. We treat the surfaces so as to render them slightly hydrophobic by use of agents, such as polymeric silicon-containing substances. The treatment may be effected with a liquid mixture containing unhydrolyzed chlorosilanes. We have, nevertheless, obtained satisfactory results merely by applying preformed silicone polymers dissolved in organic solvents. The properties of the films are unaffected by the presence of the small amounts of stripping agent that may be removed from the surface with the film. Practical working limits for Dow Corning DC 200 Silicone have been from about 0.1 mg. to 1.0 mg. per sq. ft. on glass and from 0.05 to 0.5 mg. per sq. ft. on chrome surfaces, applied as a 0.01 percent solution in CCl$_4$ and rubbed down thoroughly. Typical applications are 0.25 m./ft.$^2$ on glass and 0.15 mg./ft.$^2$ on chrome.

We have discovered furthermore that amylose films produced by our process or by the process of the application for patent previously mentioned may be further improved in transparency, water-absorption properties, wet strength, and fold endurance by a particular heat treatment after casting. The treatment is effective if applied to freshly cast film which has just gelled and may also be applied with consonant improvement to the dried film.

Our film improvement treatment comprises applying temperatures of the order of 120° C., i. e., within the range of 80° to 150° C. for a period of 5 to 20 minutes. The temperature is preferably applied in the presence of steam. Saturated steam at 15 pounds p. s. i. gage pressure has been found convenient in the laboratory for this treatment; but a considerable range of temperature is effective as previously noted. Specific illustrations of this film treatment are embodied in Examples 9 and 10 which follow. Dry heat may be used for the film treatment, but this is effective only if applied soon after casting the film while it is in a gelled but not dry condition. This procedure is embodied in Example 8.

The following specific examples illustrate the invention. Examples 1–7 illustrate the removal of the complexing agent as its water azeotrope prior to casting the films. Examples 2, 3, 4, and 5 also illustrate the improved casting technique involving the use of treated casting surfaces. Examples 8 and 9 illustrate the improved film treating method as applied to the improved film-forming process of this invention. Example 10 illustrates the wide application of our improved film treating process as applied to amylose films in general. Examples 11 and 12 are comparative examples of films cast from an aqueous amylose dispersion in the preparation of which no complexing agent was used.

The reported haze values were determined by ASTM test method D 672–45T, "Haze of Transparent Plastics by Photoelectric Cell." It should be noted that the physical tests reported are for the films containing no added plasticizer, and that this fact should be borne in mind in comparing our films with other known prepared films such as cellophane or cellulose acetate sheeting. The tensile strengths were determined on a Scott IP-2 incline plane serigraph using test strips 5–10 mm. wide and a separation between jaws of 40 mm.

EXAMPLE 1

A solution of corn amylose (93 percent amylose and 7 percent amylopectin) was prepared by adding 25 g. to 250 ml. of water at 80–85° C. containing 37½ ml. butanol and 0.125 g. of Du Pont Pontacyl Fast Blue conc. 150 percent dye. The mixture was refluxed with stirring for 10 minutes after which water-butanol azeotrope was distilled until the distillate had only one phase. Water lost by distillation was replaced by hot water so that the final amylose concentration was approximately 10 percent. The solution was filtered hot through a fritted glass disc to free it from foreign matter, then cast while hot on chrome-plated surfaces which were at room temperature, using a doctor blade set 0.030 inch above the plate surface. The film soon formed an opaque gel which cleared on drying at room temperature to a transparent, clear blue film of pleasing appearance. This film had 9 percent haze and a dry tensile strength of 6.5 kg./mm.$^2$ at 50 percent relative humidity and 72° F.

EXAMPLE 2

Glass plates (10″ x 18″) were treated with 5 ml. of solutions of Dow Corning DC 200 Silicone fluid (viscosity grade 350 centistokes) in carbon tetrachloride varying in concentrations from 5 percent to 0.001 percent. Treated plates were rubbed thoroughly with a clean soft cloth. Amylose films were cast as in Example 1 (but without the dye) on these treated plates and also on an untreated glass plate for comparison. Films were peeled only with difficulty from the untreated surface and from those surfaces treated with 0.001 percent and 0.002 percent concentrations, while the films cast on the plate treated with 1-5 percent solutions showed streakiness. Also, the solution tended to "puddle." A concentration of 0.01 percent seemed to promote consistently easy removal of films without change in appearance or properties of the films.

EXAMPLE 3

An amylose solution was prepared as in Example 1, but no dyestuff was included, and a commercial mixture of isomeric amyl alcohols ("Pentasol") was used instead of butanol. The Pentasol was removed by distillation prior to casting the film as in Example 1. The clear films, approximately 0.03 mm. in thickness, which were easily removed from the silicone-treated plate, had a dry tensile strength of 7.4 kg./mm.$^2$ at 50 percent relative humidity and 72° F. They had a folding endurance of 579 Schopper double folds, a burst resistance (Muller) of 30.7 points, and a tear resistance of 4.7 g. determined by the Elmendorf machine.

EXAMPLE 4

Films were prepared from aqueous amylose solutions as in Example 3, but using pyridine as a complexing agent to promote solubility of the amylose in water. The pyridine was removed by distillation of pyridine-water azeotrope, and films were then cast as before from the pyridine-free aqueous amylose solution. These films, 0.03 mm. thick, had a dry tensile strength of 7.6 kg./mm.$^2$, underwent 800 Schopper double folds, had a burst resistance of 25 points (Muller), and a tear strength of 7 g. (Elmendorf).

EXAMPLE 5

Films were prepared from aqueous amylose solutions using ethanol to promote solubility of the amylose in water. A slurry of 20 g. corn amylose in 70 ml. ethanol was poured into 200 ml. of water at 70° C. which was being stirred rapidly. The ethanol was removed by distillation, and the water thus removed was replaced with fresh hot water. Films were cast as in Example 3 from the hot solution on silicone-treated plates. These films had properties similar to those cited above, 0.03 mm. thick, a dry tensile strength of 8.0 kg./mm.$^2$, underwent 890 Schopper double folds, a burst resistance of 31 points (Muller), and a tear strength of 6 g. (Elmendorf).

EXAMPLE 6

Films were prepared from tapioca starch amylose by the procedure of Example 1, except that the dye was omitted and the plates silicone-treated. The amylose solution was considerably more viscous than a corresponding solution from corn amylose, and set somewhat slower to the gel stage. The resulting tapioca amylose films after drying were, however, practically identical in physical properties to those from corn amylose.

EXAMPLE 7

Films prepared as in Example 1 (dye omitted; plates silicone-treated) from white potato amylose were like those from tapioca amylose as described in Example 6.

EXAMPLE 8

An amylose solution prepared as in Example 1, omitting the dye, was cast into films on chrome-surfaced silicone-treated metal plates. After standing at room temperature for ten minutes, one film was placed in a forced-draft oven maintained at 110°-120° C. In 10-15 minutes the film appeared dry and was removed from the oven. It was found to have 6 percent haze and tensile strengths of 7.7 kg./mm.$^2$ at 50 percent relative humidity and 0.37 kg./mm.$^2$ when completely wet. Another film, similarly cast and dried, showed 5½ percent haze and tensile strengths of 78 and 0.40 kg./mm.$^2$ (50 percent R. H. and wet, respectively). Film prepared in the same way, except dried at room temperature, normally has 10 percent haze, and tensile strengths of 7.3 kg./mm.$^2$ (50 percent R. H.) and 0.20 kg./mm.$^2$ (wet).

EXAMPLE 9

An amylose solution prepared as in Example 1, omitting the dye, was cast into films on chrome-surfaced, silicone-treated metal plates at room temperature. One film, immediately on gelling, was placed in an autoclave and treated with steam at 15 p. s. i. gage for 5 minutes followed by a stream of air, also at 15 p. s. i. gage for 3 minutes. On removal from the autoclave, the film appeared nearly dry and soon was completely so, whereas, the other films had to be left overnight to dry at room temperature. Test results were:

Table I

| Test | Haze percent | Tensile strength in kg./mm.$^2$ | | Ultimate Elongation | |
| --- | --- | --- | --- | --- | --- |
| | | Dry | Wet | Dry percent | Wet percent |
| Autoclaved film | 3 | 7.9 | 0.53 | 12 | 14 |
| Non-autoclaved film | 8½ | 7.1 | 0.18 | 9 | 1" |

EXAMPLE 10

Films made from certain special types of amylose may be much hazier than those obtained from corn amylose which has been prepared in the ordinary way (see Schoch, J. A. C. S. 64, 2957 (1942). Three samples of films from such special amyloses, immediately after being cast on chrome plates and gelling, were autoclaved for 15 minutes in steam at 15 p. s. i. gage, then cooled 15 minutes in a stream of air at the same pressure. The amylose of Sample 1 was from enzyme-modified and that of Sample 3 from acid-modified corn starch, so that both were well below the usual molecular weight. Sample 2 represents a high molecular weight amylose prepared from corn starch by a special procedure.

Table II

| | Dried at | Haze percent | Tensile strength in kg./mm.$^2$ | |
| --- | --- | --- | --- | --- |
| | | | Dry | Wet |
| Sample 1 | Room temperature | 30 | 7.3 | 0.08 |
| | 120° C. steam | 5½ | 8.2 | 0.24 |
| Sample 2 | Room temperature | 16 | 6.9 | 0.20 |
| | 120° C. steam | 6 | 8.2 | 0.43 |
| Sample 3 | Room temperature | 52 | 7.5 | 0.03 |
| | 120° C. steam | 7 | 6.2 | 0.36 |

EXAMPLE 11

Ten grams of non-retrograded corn amylose was added slowly to 100 ml. of water at 82° C.

which was being stirred vigorously in a beaker. This temperature was maintained for 35 minutes during which time a watch glass was kept on the beaker to minimize evaporation and water was added to replace the amount so lost. This solution was filtered through a heated fritted glass funnel. A large proportion of the original 10 g. was not dissolved and was removed in the filtration step. A film cast from the soluble portion had 57 percent haze, less lustre than films previously described in Examples 1–10, a dry tensile strength of 7.2 kg./mm.² at 72° F. and 50 percent R. H., and endured 651 Schopper double folds before breaking.

EXAMPLE 12

Five grams of non-retrograded corn amylose was added to 50 ml. of boiling water which was being stirred in a round-bottomed flask. The mixture was refluxed for 1 hour with stirring. Solution was slow with the result that some gelatinous amylose hardened on the bottom inner surface of the flasks (in some cases it is difficult to avoid scorching of this amylose). After filtration, films were cast as in Example 3. The films had 16.5 percent haze, a tensile strength of 6.8 kg./mm.², and a folding endurance of 529 Schopper double folds.

We claim:

1. The process comprising dissolving corn amylose in water containing a water soluble amylose complexing agent taken from the class of lower alkanols, heating to obtain a clear solution, removing the complexing agent by distillation, leaving an aqueous corn amylose solution, forming said solution upon a surface at room temperature, and allowing it to gel and dry to a film.

2. The process of claim 1 in which the complexing agent is butanol.

3. The process of claim 1 in which the complexing agent is ethanol.

4. The process of claim 1 in which the complexing agent is an amyl alcohol.

5. The process of claim 1 in which the cast film in a gelled but not dry state is subjected to heat treatment at 80 to 150° C. for 5 to 20 minutes.

6. A process for the preparation of amylose films which comprises mixing an amylaceous substance comprising at least 50 percent amylose with an aqueous solution of an amylose complexing agent having appreciable solubility in water, removing the amylose complexing agent, leaving an aqueous amylose solution, and subsequently disposing the solution upon a casting surface and drying the formed film.

7. A process for the preparation of amylose films which comprises forming an amylose complex from an amylaceous substance, which substance comprises at least 50 percent amylose, in an aqueous medium by means of an amylose complexing agent having appreciable solubility in water, taken from the group consisting of lower alkanols and glycol ethers of lower alkanols, removing the amylose complexing agent from the amylose solution thus produced and subsequently disposing the aqueous solution upon a casting surface and drying the formed film.

8. The process which comprises adding an amylaceous substance comprising at least 50 percent amylose to an aqueous medium containing an amylose complexing agent having appreciable solubility in water and selected from the group consisting of low molecular weight aliphatic alcohols, heating the mixture until solution of the amylose occurs, removing the complexing agent, leaving an aqueous solution of amylose, and disposing the aqueous solution upon a casting surface and drying the formed film.

9. Process of claim 8 in which the complexing agent is butanol.

10. Process of claim 8 in which the complexing agent is ethanol.

11. Process of claim 6 in which the complexing agent is pyridine.

12. The method of claim 8 in which the cast film is subjected to a heat treatment at a temperature of 80° to 150° C. for 5 to 20 minutes.

13. The method of claim 8 in which the cast film is subjected to a heat treatment with steam at a temperature of 80° to 150° C. for 5 to 20 minutes.

14. The method of claim 8 in which the cast film is subjected to a heat treatment with air at a temperature of 80° to 150° C. for 5 to 20 minutes, said treatment taking place during the drying of the film.

15. The method of claim 8 in which the film is cast upon a surface treated with a silicone polymer.

16. The process comprising mixing an amylaceous substance which comprises about 93 percent corn amylose and about 7 percent amylopectin with water containing a water soluble amylose complexing agent taken from the class of lower alkanols, heating to obtain a clear solution, removing the complexing agent by distillation, leaving an aqueous corn amylose solution, forming said solution upon a surface at room temperature, and allowing it to gel and dry to a film.

IVAN A. WOLFF.
HOWARD A. DAVIS.
JAMES E. CLUSKEY.
LAETTA J. GUNDRUM.

REFERENCES CITED

The following references are of record in the file of this patent:

UNITED STATES PATENTS

| Number | Name | Date |
|---|---|---|
| 2,137,168 | Levey | Nov. 15, 1938 |
| 2,461,480 | Rockmeyer | Feb. 8, 1949 |

OTHER REFERENCES

Ziegler: "Plastics Technology," India Rubber World, September 1946, pp. 826–829.